*(12)* United States Patent
O'Neil et al.

(10) Patent No.: US 7,773,572 B2
(45) Date of Patent: Aug. 10, 2010

(54) INTELLIGENT PICO-CELL FOR TRANSPORT OF WIRELESS DEVICE COMMUNICATIONS OVER WIRELINE NETWORKS

(75) Inventors: Douglas O'Neil, Marietta, GA (US); John Alson Hicks, III, Roswell, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 12/606,553

(22) Filed: Oct. 27, 2009

(65) Prior Publication Data

US 2010/0046490 A1 Feb. 25, 2010

Related U.S. Application Data

(63) Continuation of application No. 11/276,269, filed on Feb. 21, 2006, now Pat. No. 7,623,857.

(60) Provisional application No. 60/729,284, filed on Oct. 21, 2005.

(51) Int. Cl.
*H04W 76/00* (2009.01)
(52) U.S. Cl. .................. 370/338; 370/328; 370/352; 455/426.1; 455/426.2; 455/560
(58) Field of Classification Search .......... 370/338, 370/328, 352; 455/426.1, 426.2, 560
See application file for complete search history.

(56) References Cited

U.S. PATENT DOCUMENTS

| 6,266,537 | B1 | 7/2001 | Kashitani |
|---|---|---|---|
| 6,363,261 | B1 | 3/2002 | Raghavan |
| 6,710,651 | B2 | 3/2004 | Forrester |
| 7,142,861 | B2 | 11/2006 | Murai |
| 7,146,153 | B2 | 12/2006 | Russell |
| 7,623,857 | B1 | 11/2009 | O'Neil et al. |
| 2005/0172148 | A1 | 8/2005 | Ying |
| 2005/0177645 | A1 | 8/2005 | Dowling et al. |
| 2005/0254451 | A1 | 11/2005 | Grosbach |
| 2007/0002844 | A1 | 1/2007 | Ali |
| 2007/0032225 | A1* | 2/2007 | Konicek et al. ............. 455/417 |
| 2007/0097938 | A1 | 5/2007 | Nylander et al. |
| 2007/0097983 | A1 | 5/2007 | Nylander et al. |
| 2007/0155421 | A1 | 7/2007 | Alberth et al. |
| 2007/0199076 | A1 | 8/2007 | Rensin et al. |
| 2007/0258418 | A1 | 11/2007 | Wurtenberger et al. |
| 2010/0040026 | A1* | 2/2010 | Melkesetian ................ 370/332 |

FOREIGN PATENT DOCUMENTS

GB 2425921 A 11/2006

OTHER PUBLICATIONS

International Search Report and Written Opinion dated Oct. 27, 2009 for PCT Application Serial No. PCT/US2009/043861, 14 pages.

(Continued)

*Primary Examiner*—David Q Nguyen

(57) ABSTRACT

In one embodiment a pico cell may be used to detect a presence of a wireless device and receive a wireless signal from the wireless device. The wireless signal may then be converted from a protocol used by the wireless device to a converted signal in a protocol suitable for use with a broadband connection. The converted signal may then be transmitted over the broadband connection.

17 Claims, 4 Drawing Sheets

OTHER PUBLICATIONS

International Search Report and Written Opinion mailed Feb. 23, 2010, for PCT Application No. PCT/US2009/043846, 13 pages.
OA dated Dec. 31, 2009 for U.S. Appl. No. 11/457,129, 16 pages.
OA dated Apr. 17, 2009 for U.S. Appl. No. 11/276,269, 15 pages.
OA dated Nov. 4, 2008 for U.S. Appl. No. 11/276,269, 15 pages.
Kaul; "Verizon's $250 femto box - A deliberate ploy behind the aggressive pricing?" Posted Tue, Jan. 20, 2009 13:19:46 EST; http://www.abiresearch.com/research_blog/569; © 2009 Allied Business Intelligence, Inc.

* cited by examiner

¹

INTELLIGENT PICO-CELL FOR TRANSPORT OF WIRELESS DEVICE COMMUNICATIONS OVER WIRELINE NETWORKS

CROSS-REFERENCE TO RELATED APPLICATIONS

This application is a continuation of U.S. patent application Ser. No. 11/276,269 entitled "INTELLIGENT PICO-CELL FOR TRANSPORT OF WIRELESS DEVICE COMMUNICATIONS OVER WIRELINE NETWORKS" and filed Feb. 21, 2006, which is based on, and claims priority from, U.S. provisional patent application Ser. No. 60/729,284, filed on Oct. 21, 2005 entitled "INTELLIGENT PICO-CELL FOR TRANSPORT OF WIRELESS DEVICE COMMUNICATIONS OVER WIRELINE NETWORKS" and is commonly assigned herewith. The entireties of the above-referenced patent applications are hereby incorporated by reference.

BACKGROUND

Given their portable nature and ease of use, wireless devices (such as cellular phones) have enjoyed wide proliferation. This is especially the case among users who move around frequently, but wish to stay in contact with their work colleagues, families and other individuals or entities of importance.

Often, however, coverage problems may arise when a user attempts to use a wireless device inside of a building. For example, many electromagnetic signals (such as radio frequencies used by WiFi devices and cellphones) are unable to fully propagate through walls, metalized glass or other common building materials which separate the inside of a building from an outside environment. As a result, the user may experience a degradation of service or may be precluded entirely from sending or receiving information from their wireless device to an existing outside network.

SUMMARY

This summary is provided to introduce simplified concepts of an intelligent pico-cell for the transport of wireless device communications over wireline networks, which is further described below in the Detailed Description. This summary is not intended to identify essential features of the claimed subject matter, nor is it intended for use in determining the scope of the claimed subject matter.

In one embodiment a pico cell may be used to detect a presence of a wireless device and receive a wireless signal from the wireless device. The wireless signal may then be converted from a protocol used by the wireless device to a converted signal in a protocol suitable for use with a broadband connection and the converted signal may be transmitted over the broadband connection.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Environment

Figure 1:
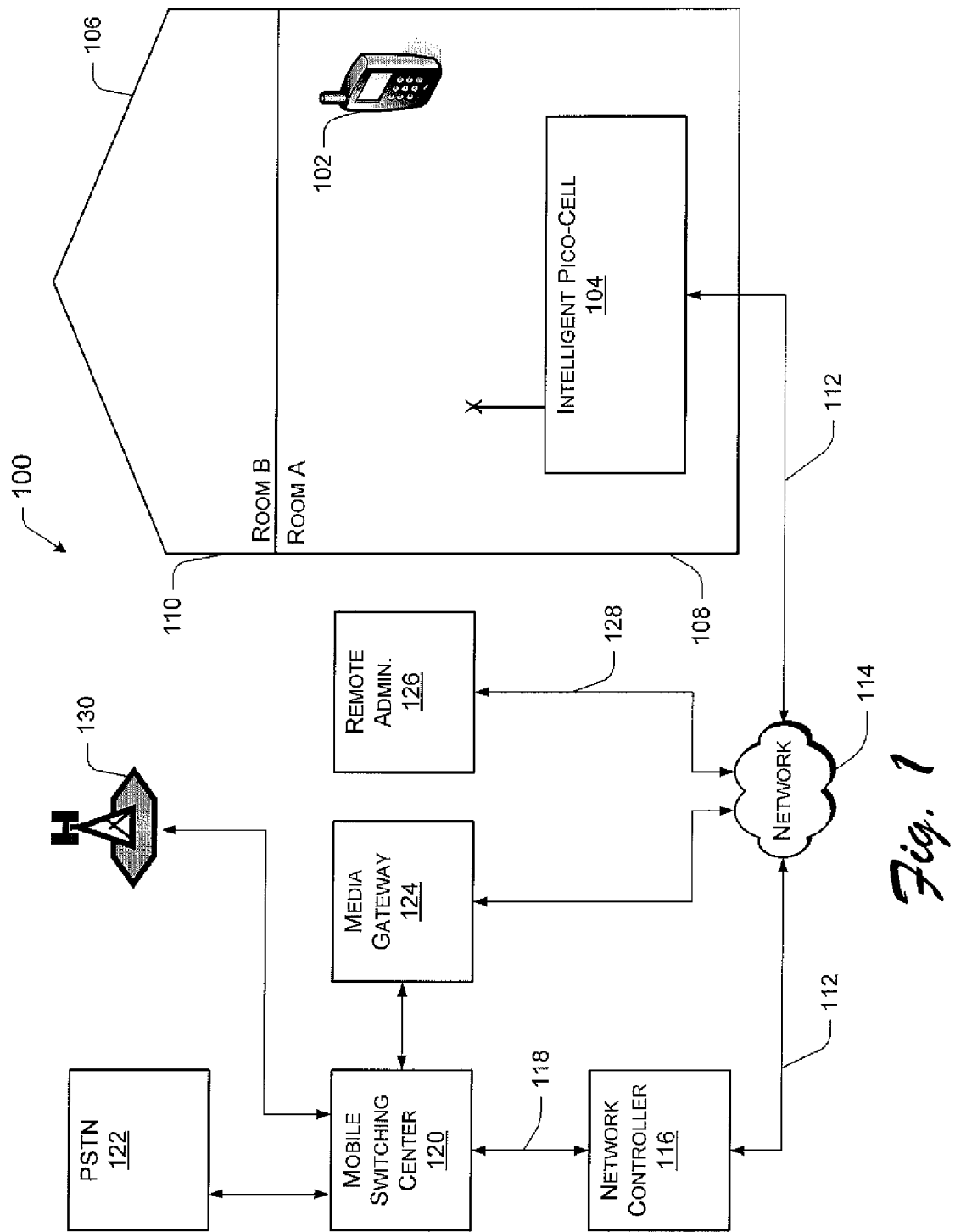
FIG. 1 is a block diagram illustrating an exemplary environment including an intelligent pico-cell connected to a wireline network.

FIG. 1 shows an exemplary environment 100 in which the techniques described herein can be implemented. Environment 100 comprises a wireless device 102 and an intelligent pico-cell 104. In the example described herein, wireless device 102 is a cell phone and intelligent pico-cell 104 is an intelligent cellular pico-cell. However, wireless device 102 could alternately comprise a variety of other types of computer and computer-like devices, such as, for example, a tablet PC, a personal digital assistant (PDA), or a workstation, which rely on wireless technologies to connect to an existing network. Moreover, intelligent pico-cell 104 could comprise any pico-cell configuration capable of operating in conjunction with wireless device 102.

Generally, a wireless device such as the one shown in FIG. 1 may have varied functionality allowing a user to perform many different tasks. For example, in addition to sending and receiving voice-based communications, a user may also be able to use wireless device 102 to run a host of standard computer programs (word processing, spreadsheets, etc.) and games, send and receive emails, browse the Internet, etc.

Intelligent pico-cell 104 generally approximates a cellular base station. Unlike an expansive cellular base station, however, intelligent pico-cell 104 may benefit from a small size— including dimensions less than or equal to those of a WiFi access point. As a result, intelligent pico-cell 104 can fit easily and unobtrusively in a building environment 106.

As shown in FIG. 1, intelligent pico-cell 104 may be placed in a room A 108 of the building environment 106. It would also be possible, however, to place intelligent pico-cell 104 in various other spaces in the building environment 106, for example, in another room, room B 110, within the building environment 106. Assuming that one possible implementation of building environment 106 is a residence, intelligent pico-cell 104 may be placed in a bedroom (not shown), a kitchen (not shown), or a dining room (not shown).

In operation, uplink signals from wireless device 102 may be received by intelligent pico-cell 104 and transmitted over a broadband connection 112, such as a broadband data service, and/or a broadband data network 114, such as the Internet, to network controller 116, such as an unlicensed mobile access (UMA) network controller. Transmission of the uplink signals over connection 112 and/or network 114 may be conducted utilizing the UMA protocol or any other protocol in which the signals may be transmitted using an Internet protocol security (IPSEC) tunnel to network controller 116. More detail on how this may be accomplished is provided in the discussion of FIG. 2 below. Moreover, once wireless device 102 begins communicating with network controller 116 via pico-cell 104, wireless device 102 may register itself to a cellular network through pico-cell 104 using normal cellular registration protocols.

At network controller 116, encoded information received using the IPSEC tunnel is converted into an interface protocol, such as the cellular A interface protocol, and the information may then be transmitted over a coupling 118 to a mobile switching center 120. In addition, network controller 116 may also be able to support multiple devices having ISPEC tunnel compatible clients (such as UMA clients). In this way network controller 116 can distribute commands, instructions and data addresses to several different devices based on the identities of the devices as designated by the ISPEC tunnel compatible clients the devices contain.

Once the signals are sent from network controller 116, they may be received in mobile switching center 120, from which the signals may then be communicated to a public switched telephone network (PSTN) 122, where the signals may then be transmitted to any network in the world. Alternately, the signals my be transmitted from mobile switching center 120 to a media gateway 124 where the signals may then be coupled to a network 114 such as the Internet.

In the other direction, once signals intended for wireless device 102 are received at mobile switching center 120 (from elements including mobile gateway 124, PSTN 122, another mobile switching center, or a base station) a reverse path is followed. For example, the signals are transmitted from mobile switching center 120 to network controller 116 where the signals are converted from an interface protocol, such as the cellular A interface protocol, to a protocol in which the signals may be transmitted using an IPSEC tunnel to intelligent pico-cell 104 (such as the UMA protocol). Network controller 116 may be able to route the signals to the correct intelligent pico-cell 104 corresponding to the device 102 through the location and identification of a client (such as an UMA client) in intelligent pico-cell 104 with which wireless device 102 is communicating.

Once the correct intelligent pico-cell 104 is located, network controller 116 may transmit the signals over network 114 and connection 112 to intelligent pico-cell 104, where the signals may be downlinked from intelligent pico-cell 104 to wireless device 102 using, for example, radio waves. Radio waves which may be used for this purpose may include typical RF values used for cellular telephone transmission, including frequencies or channels which are licensed by cellular carriers.

Intelligent pico-cell 104 may also receive commands and instructions from a remote administrator 126. These commands may be sent to intelligent pico-cell 104 from remote administrator 126 over a connection 128, and/or a network (such as network 114 illustrated in FIG. 1) and connection 112. In addition, information regarding intelligent pico-cell 104 and wireless device 102 may be collected by remote administrator 126 over connection 128, and/or network 114, and connection 112

In one implementation, remote administrator 126 may allow a cellular carrier to administer on a per pico-cell basis the licensed channels or frequencies available to the cellular carrier for the particular location in which intelligent pico-cell 104 may be found. In another possible implementation, remote administrator 126 may allow an entity to deduce the location of intelligent pico-cell 104 through examination of the channels which intelligent pico-cell 104 is able to sense. This functionality will be described in more detail in conjunction with FIG. 2 below.

In yet other implementations, remote administrator 126 may be able to shut down intelligent pico-cell 104, or allow software updates to be downloaded to intelligent pico cell 104.

By utilizing intelligent pico-cell 104, the user of a wireless device 102 may be afforded a dependable, high-quality connection to mobile switching center 120. In essence, pico-cell 104 acts like a localized macro-cell, performing all of the functions (and potentially more) that might be performed by a typical macro cell, but in the confines of a smaller environment, such as the building environment 106.

In contrast, without intelligent pico-cell 104, the user would have to rely on direct communication between wireless device 102 and an available macro-cell, such as macro-cell 130—which could include a cellular macro-cell base station. Macro-cell 130 is illustrated in FIG. 1 as being in communication with mobile switching center 120. In such a scenario, deprecation of signal transmission quality or total failure to achieve communication between wireless device 102 and macro-cell 130 could result from (1) interference to the propagation of electromagnetic signals posed by walls, windows and other obstructions placed by the building environment 106 between wireless device 102 and macro-cell 130; as well as (2) propagation difficulties posed by the distance between macro-cell 130 and wireless device 102.

Though not shown in FIG. 1, it is also possible for other macro-cells to be present in environment 100. Such macro-cells could be coupled to mobile switching center 120, or to other mobile switching centers, who themselves are coupled to network controller 116 and media gateway 124.

Similarly, it will be understood that even though only one intelligent pico-cell 104 is illustrated in the building environment 106, a plurality of intelligent pico-cells could be employed in various locations throughout the building environment 106. In this manner, seamless, high quality signal transmission between wireless device 102 and the networks of various cellular and other providers could be ensured in particular locations of the building environment 106, or if desired, throughout the entire building environment 106.

Additionally, it will be understood that the building environment 106, may include any structure, area, formation, or environment having a connection to an external network (such as the Internet) and in which obstructions exist between a wireless device 102 and an outside network, such as an outside cellular network. Thus building environment 106 may, for example, include homes, places of business, hospitals, underground facilities, and any other locations where reception and transmission of wireless signals to and from a network is problematic. For example, in elevators, where wireless communications with the outside environment are often prone to disruption, an intelligent pico-cell 104 may be placed in the elevator shaft. In such a configuration the shaft may act as a wave guide, allowing high quality communication between the pico cell 104 and wireless device(s) 102 as wireless device(s) 102 travel up and down the shaft in the elevator(s).

Intelligent Pico-Cell

Figure 2:
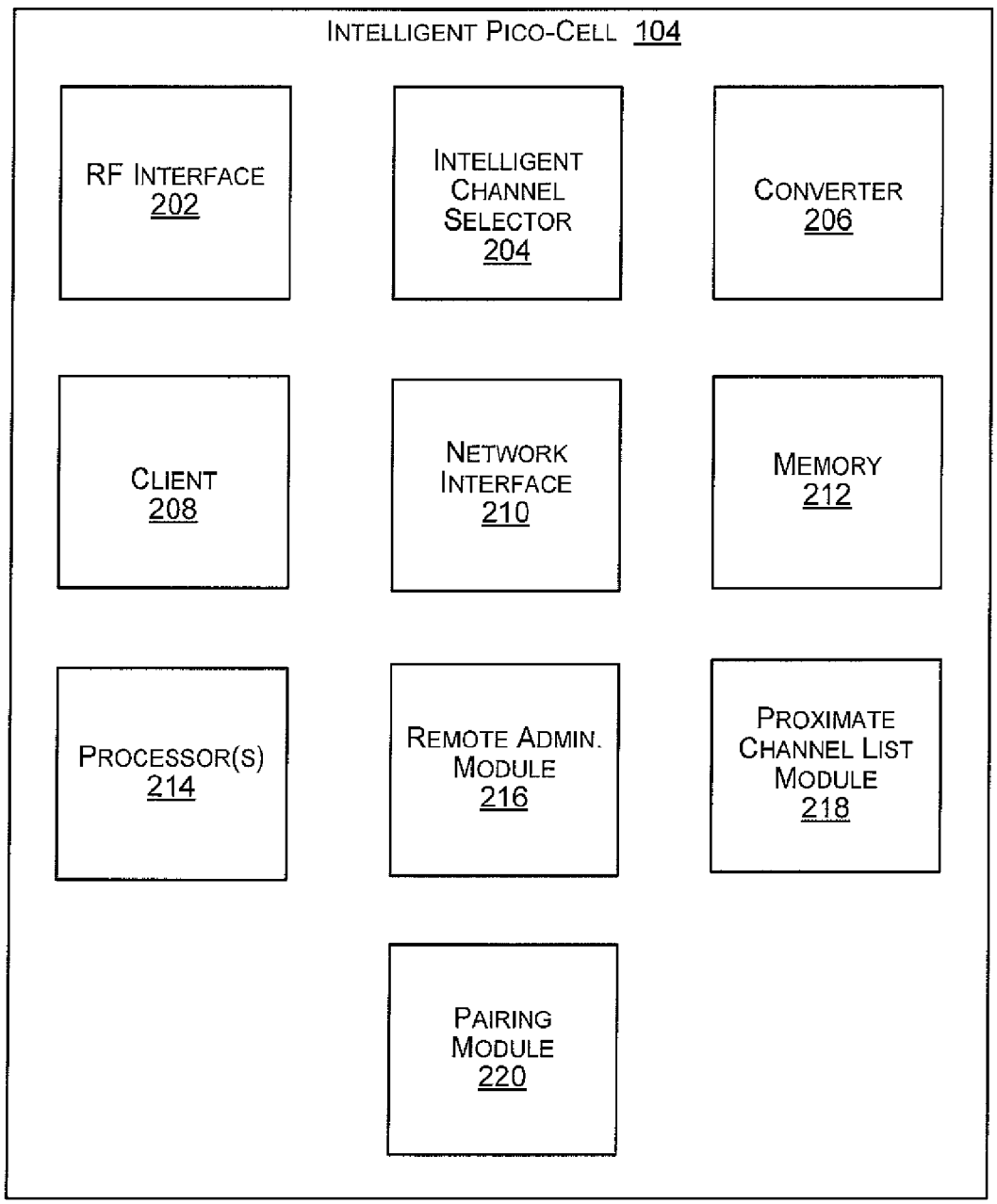
FIG. 2 is a block diagram illustrating the intelligent pico-cell.

FIG. 2 illustrates relevant functional components of intelligent pico-cell 104 which allow intelligent pico-cell 104 to connect wireless device 102 to an outside network according to an exemplary embodiment. These components may include an RF interface 202, an intelligent channel selector 204, a converter 206, a client 208 (such as a UMA client), a network interface 210, memory 212, one or more processors 214, a remote administrator module 216, a proximate channel list (PCL) module 218, and a pairing module 220.

RF interface 202 may be used to receive information being emitted (uplinked) using electromagnetic signals, such as RF waves, by wireless device 102. In the same way, intelligent pico-cell 104 may detect signals being downlinked from macro cells, such as macro-cell 130, in proximity with intelligent pico-cell 104. Additionally, RF interface 202 may be used to emit (downlink) data signals to devices such as wireless device 102 and proximate macro-cells identifying intelligent pico-cell 104 and providing such information as the identity of the cellular carrier in control of pico-cell 104. These emissions may be in the form of any suitable electromagnetic signal, including common RF frequencies.

RF interface 202 may also be used to issue commands, such as instructions to wireless device 102 to switch to a set channel, or power down to a set level, such that interference with other devices, including proximate macro cells or other intelligent pico-cells 104, may be avoided or decreased.

The signals received by RF interface 202 identifying macro-cells, other intelligent pico-cells 104, and wireless devices 102, may be used by intelligent channel selector 204 to determine what downlink channel (commonly characterized as a radio frequency) and power level are appropriate for a particular wireless device 102 to receive service of an acceptable quality from intelligent pico-cell 104 without interfering with devices such as proximate macro-cells, intelligent pico-cells 104, and other wireless devices 102. This determination may be based on the attainment of an acceptable level of quality regarding access to a particular cellular carrier's network, or it may be based on pre-existing conditions and instructions depending on the identity and privilege associated with a particular wireless device 102 and/or its user. Once the appropriate downlink channel and power level are determined by intelligent channel selector 204, they may be communicated to wireless device 102 through use of RF interface 202.

Converter 206 in intelligent pico-cell 104 may be utilized to convert protocols associated with wireless device 102, including protocols such as the global system for mobile communications (GSM) protocol, and the code division multiple access (CDMA) protocol, into protocols suitable for transmission over connection 112.

The converted signals may then be transmitted via, for example, an IPSEC tunnel by client 208 in such a manner that the signals may be successfully sent over connection 112 and/or network 114 to network controller 116. In one possible implementation, client 208 may utilize the UMA protocol for this purpose. In another possible implementation, converter 206 may be a part of client 208.

Network interface 210, may then be used by client 208 to establish a coupling to connection 112. Network interface 210 may include communications ports, such as network ports, allowing network interface 210 to connect intelligent pico-cell 104 to a local area or wide-area network, and/or to the Internet 114 via connection 112. Other types of communications media might alternatively be used, including both wired and wireless technologies.

In general, network interface 210 may include an Ethernet modem, a Direct Subscriber Line (DSL) modem, a cable modem, a residential gateway, or any other device necessary to establish communication with connection 112. In addition, network interface 210 may enable intelligent pico-cell 104 to send and receive voice and data among a multitude of electric devices communicatively coupled to the connector 112— including network controller 116 and remote administrator 126. In this way voice and data can be delivered between intelligent pico-cell 104 and network controller 116 in real-time.

Network interface 210 may also be used to receive commands, instructions, and data from remote administrator 126 over connection 112. The commands, instructions, and data received from remote administrator 126 may be transmitted to remote administrator module 216 within intelligent pico-cell 104 via network interface 210. In this way, as mentioned above, remote administrator 126 may be able to remotely dictate, and limit, the channel set used by intelligent pico-cell 104. Moreover, remote administrator 126 may also be able to regulate other qualities and functions of interest to entities, such as cellular carriers, or particular users who may have the rights to, or control of, intelligent pico-cell 104. For example, remote administrator 126 may restrict use of intelligent pico-cell 104 to wireless devices 102 associated with accounts of specific carriers, or which have a specified privilege associated with them.

In addition, through use of network interface 210, remote administrator module 216 may be able to collect data regarding the operation, environment, location, and the potential and actual users of intelligent pico-cell 104. Moreover, as mentioned above, remote administrator module 216 may allow an entity to deduce the location of intelligent pico-cell 104 through examination of the channels which intelligent pico-cell 104 is able to sense. For example, in one possible implementation, PCL module 218 may be capable of storing a list of channel identifiers of RF channels from proximate macro-cells 130 and proximate pico-cells, along with RF strength levels of those channels. PCL module 218 may upload this list upon creation or whenever PCL module 218 either sends an update to, or receives an update from, remote administrator module 216. Remote administrator module 216 may store the list—either in whole or in part—for each pico-cell with which remote administrator module 216 is in contact, in a database. Using the list's information, remote administrator module 216 may compare the identifiers of an RF channel for pico-cell 104 to a list of channel identifiers for all of a carrier's markets (from, for example, a separate database), and from this comparison determine the particular local market for pico-cell 104. Moreover, based on this comparison, remote administrator module 216 may also be able to instruct pico-cell 104 on the range of licensed channels for the carrier in the location of pico-cell 104.

Memory 212 may be used to store programs executed on the processor(s) 214 and data generated during their execution. Memory 212 may include various computer-readable storage media, such as volatile media, non-volatile media, removable media, and non-removable media. It will be understood that volatile memory may include media such as random access memory (RAM), and non volatile memory may include read only memory (ROM). Intelligent pico-cell 104 may also include other removable/non-removable, volatile/non-volatile computer storage media such as a hard disk drive for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. The disk drives and their associated computer-readable media provide non-volatile storage of computer readable instructions, data structures, program modules, and other data for intelligent pico-cell 104.

In addition to including a hard disk, a removable magnetic disk, and a removable optical disk, as discussed above, memory 212 may also include other types of computer-readable media, which may store data that is accessible by a computer, such as magnetic cassettes or other magnetic storage devices, flash memory cards, electrically erasable programmable read-only memory (EEPROM), and the like. The hard disk drive, magnetic disk drive, and optical disk drive may each be connected to a system bus by one or more data media interfaces. Alternatively, the hard disk drive, magnetic disk drive, and optical disk drive may be connected to the system bus by one or more interfaces.

Any number of programs, program modules, data objects, or other data structures may be stored in memory 212 including an operating system, one or more application programs, other program modules, and program data.

Intelligent pico-cell 104 may also be configured such that a user may enter commands and information into intelligent pico-cell 104 via input devices such as a keyboard, pointing device, serial port, and/or the like. These and other input devices may be connected to the one or more processors 214 via input/output interfaces that are coupled to the system bus. Additionally, they may also be connected by other interface and bus structures, such as a parallel port, game port, universal serial bus (USB) or any other connection included in network interface 210.

In a networked environment, modules depicted and discussed above in conjunction with intelligent pico-cell 104 or portions thereof, may be stored in a remote memory storage device. By way of example, remote application programs may reside on a memory device of a remote computer communicatively coupled to connection 112. For purposes of illustration, application programs and other executable program components—such as an operating system or intelligent channel selector 204—may reside at various times in different storage components of intelligent pico-cell 104, or of a remote computer, and may be executed by one of the at least one processors 214 of intelligent pico-cell 104 or the remote computer.

It should be noted that intelligent pico-cell 104, may be very simple to use. For example, as mentioned above, the small size of intelligent pico-cell 104 makes it easy to install by end users. Moreover, as mentioned above, given the functionality of intelligent channel selector 204, intelligent pico-cell 104 may also be able to self-configure itself by examining its environment, noting the presence of competing macro-cells and other intelligent pico-cells 104, and noting the presence of wireless devices 102. With this information, intelligent pico-cell 104 may issue commands to wireless device(s) 102 to communicate with intelligent pico cell 104 using specific channels chosen to avoid interference with competing devices. In addition, intelligent pico-cell 104 may command wireless device 102 to use a certain power level such that interference with competing devices is reduced or eliminated. Given the proximity of intelligent pico-cell 104 to wireless device 102, a very low operating power may be established in this manner, thus prolonging the battery life of wireless device 102.

Additionally, since intelligent pico-cell 104 is able to recognize all of the downlink channels in use around it from other devices, including macro cells, intelligent pico-cell 104 is able to choose an appropriate channel that wireless device 102 is able to support given the unique configuration of wireless device 102. Thus, common cellular phones may be used with intelligent pico-cell 104 without any need for user-driven alteration of the cellular phones. Instead, intelligent pico cell 104 may communicate directly with the cellular phone and command the cellular phone to change itself to an appropriate channel (and power level) to communicate with intelligent pico-cell 104 such that a high level of quality of service is received from intelligent pico-cell 104. In one possible implementation management of frequencies and power levels between intelligent pico-cell 104 and a macro-cell 130 may by accomplished through use of intelligent channel selector 204.

Additionally, it will be understood that the pico cell 104 may be able to facilitate an in call handoff of wireless device 102. For example, while outside of building environment 106 a user communicating via wireless device 102, may be connected to mobile switching center 120 via macro-cell 130. As the user approaches or enters the building environment 106, the quality of connection of wireless device 102 to mobile switching center 120 may be improved by coupling wireless device 102 to mobile switching center 120 via intelligent pico-cell 104. At such point, a decision can be made within pico-cell 104 by, for example, intelligent channel selector 204, to handoff wireless device 102 from macro-cell 130 to pico-cell 104. In practice this may be accomplished several different ways, including, for example, through communication between intelligent pico-cell 104 and macro-cell 130, directly or via mobile switching center 120.

In a similar manner this process may also be run in reverse. For example, pico-cell 104 may handoff wireless device 102 to macro-cell 130 when the quality of service which may be provided by macro cell 130 exceeds that which may be provided by pico-cell 104.

Regardless of if wireless device 102 is handed off from macro-cell 130, or wireless device 102 makes initial contact with pico-cell 104 itself, wireless device 102 may need to be screened to see if wireless device 102 may access pico-cell 104. In one possible implementation, such screening may be handled by pairing module 220, which may examine wireless device 102 and confirm that wireless device has security or other clearances sufficient to allow wireless device 102 to communicate with, and through, pico-cell 104.

Moreover, pairing module 220 may also enable an end user to pair pico-cell 104 with a personal cell phone and one or more other selected cell phones of the user's choice at the exclusion of all other cell phones. In one exemplary implementation, a button may be located on a side of pico-cell 104, which can be depressed, enacting pairing module 220 to receive a device identifier from memory 212 corresponding to each active wireless device 102 currently communicating with pico-cell 104. In yet another implementation, a computer interface (not shown for the sake of graphic clarity) coupled to pico cell 104 may allow a user to register wireless devices 102 which can be used with pico cell 104.

Also, since intelligent pico-cell 104 includes a client 208, such as an UMA client, no inclusion of a bulky and/or costly client device in a cellular phone is necessary to enable the cellular phone to communicate with intelligent pico-cell 104.

It will also be understood that all the elements discussed above with regard to intelligent pico-cell 104 may be implemented by software, hardware or a combination thereof.

Security functions, such as determining user privilege to enter a cellular carrier's network, or defensive mechanisms against the passing of viruses, may also exist in both intelligent pico-cell 104, as well as in network controller 116, mobile switching center 120, or any point between these elements and intelligent pico-cell 104.

Placing a Wireless Device in Communication with a Wireline Network

Figure 3:
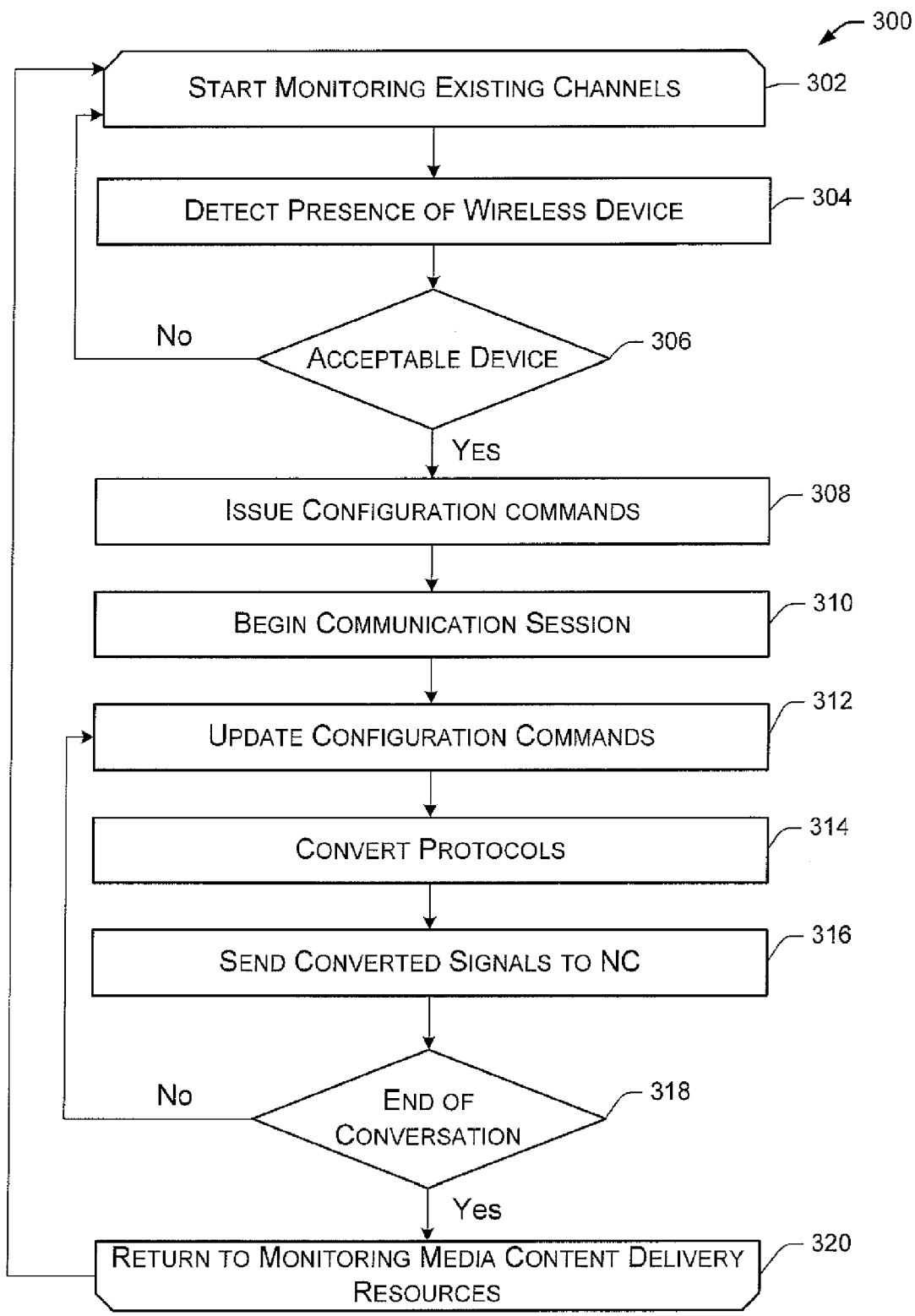
FIG. 3 is a flow diagram illustrating a method of using the intelligent pico-cell to connect a wireless device to a wireline network.

FIG. 3 illustrates an exemplary method 300 for utilizing intelligent pico-cell 104 to connect a wireless device 102 to an external wireless or wireline network. For ease of understanding, method 300 is delineated as separate steps represented as independent blocks in FIG. 3; however, these separately delineated steps should not be construed as necessarily order dependent in their performance. Additionally, for discussion purposes, method 300 is described with reference to elements in FIGS. 1-2. Although, at least parts of method 300 could be performed by elements other than those shown in FIGS. 1 and 2 without departing from the spirit and scope of the subject matter described herein.

Method 300 monitors existing channels to detect the presence of other devices, including wireless devices (block 302). This monitoring may be conducted using RF interface 202 in accordance with instructions issued by PCL module 218. Moreover, the monitoring may be done continuously, or it may be conducted at regular intervals, or intervals determined in some other fashion.

When a wireless device 102 is detected, pairing module 220 may examine signals uplinked from wireless device 102 to determine if wireless device 102 may be granted access to intelligent pico-cell 104 (block 306). Some of these uplinked signals may be solicited by queries from pico-cell 104. If pairing module 220 determines that wireless device 102 embodies a privilege level or credentials necessary to access intelligent pico-cell 104 (for example, wireless device 102 is subscribed to a suitable cellular carrier or it is connected with other suitable privileges or credentials), then wireless device 102 may be allowed to connect to intelligent pico-cell 104 ("yes" branch from block 306). Conversely, if pairing module 220 determines that wireless device 102 does not embody the necessary privilege level or credentials to access intelligent pico-cell 104, wireless device 102 may be refused access to intelligent pico-cell 104 and be left to try and find another device, such as another pico cell or macro cell, with which to communicate ("no" branch from block 306).

Once wireless device is granted access to intelligent pico cell 104, the channels available for communication between intelligent pico-cell 104 and wireless device are identified by intelligent channel selector 204 through use of, for example, PCL module 218. A power level and one of the suitable channels may then be selected by intelligent channel selector 204 in order to enable successful communication between intelligent pico-cell 104 and wireless device 102 while avoiding interference from electromagnetic signals from other devices, such as other wireless devices, pico-cells or proximate macro-cells. Configuration commands relating to the channel and power information are then communicated to wireless device 102 from intelligent channel selector 204, such that wireless device 102 may reconfigure itself to communicate effectively with intelligent pico-cell 104 (block 308).

After wireless device 102 is properly configured to communicate with pico-cell 104, a communication session can be begun (block 310). Such a communication session can include, for example, a registration session, a normal phone conversation, or a data communication session.

During the communication session, the configuration settings used by wireless device 102 to communicate with pico-cell 104 may be monitored and updated if necessary (block 312). For example, PCL module 218 may monitor available channels through RF interface 210, and update a stored list of channel identifiers of RF channels from proximate macro-cells 130 and proximate pico-cells, along with RF strength levels of those channels. This information may be accessed by intelligent channel selector 204 and used to improve quality of communications between wireless device 102 and pico-cell 104—or lessen or avoid interference with other pico-cells, macro-cells, and wireless devices. This may be done by the issuance commands from intelligent channel selector 204 via RF interface 202 directing wireless device 102 to switch to another more favorable channel and/or power setting.

Communications received from wireless device 102 on the given channel and/or at the desired power level as mandated by intelligent channel selector 204 are then converted at converter 206 from the protocol used by wireless device 102 to a protocol used by client 208, such as UMA, which is suitable for use with a broadband connection (block 314). The signals may then be sent via network interface 210 over the broadband connection, to network controller 116 (block 316). In one implementation, the signals may be sent via an IPSEC tunnel to network controller 116 Once received by network controller 116, the signals may then be delivered to mobile switching center 120, before being delivered to the address identified by wireless device 102 as the destination for the signals.

If the end of a conversation is reached, or the stream of data being send by wireless device 102 ceases ("yes" branch from block 318), then method 300 loops back to block 302 (block 320). Alternately, if the conversation isn't finished, or if more data is being sent by wireless device 102 ("no" branch from block 318), method 300 returns to block 312 where RF interface 202 may receive more signals from wireless device 102.

It will be understood that communication from intelligent pico-cell 104 to wireless device 102 may also take place using the same mechanism described in method 300 above. For example, once a wireless device has been granted access to intelligent pico-cell 104, it may be registered via the broad band connection to a network to which intelligent pico-cell 104 is connected. Then, if information addressed to wireless device 102 is received by the network, the information may be routed to intelligent pico-cell 104 via the broadband connection. The information may then be converted to a protocol suitable for wireless device 102 and sent to wireless device 102 by intelligent pico-cell 104.

Method of Remotely Establishing Policy

Figure 4:
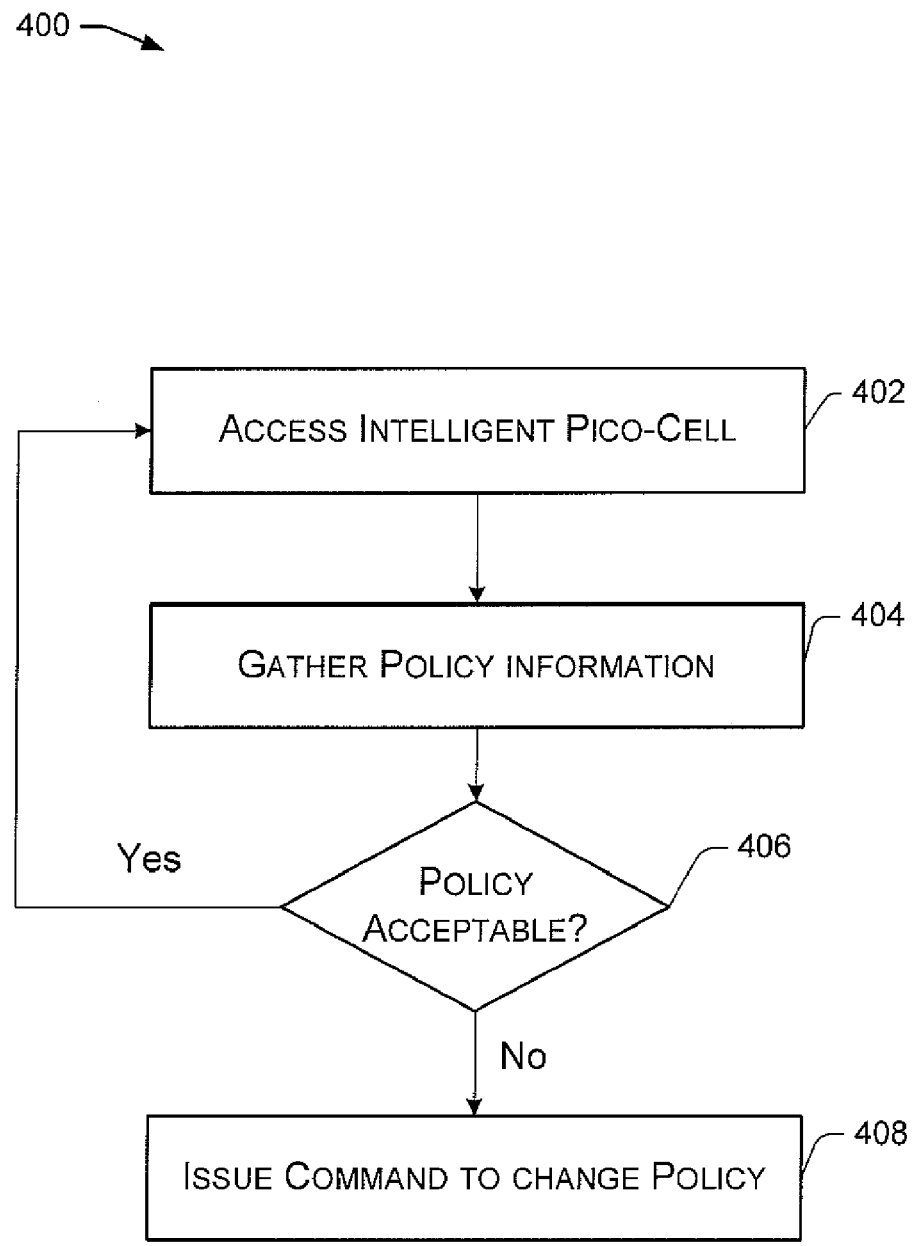
FIG. 4 is a flow diagram illustrating a method of controlling the intelligent pico-cell remotely.

FIG. 4 illustrates an exemplary method 400 for remotely establishing policy guiding the operation of, and allowance of access of users to, intelligent pico-cell 104. For ease of understanding, method 400 is delineated as separate steps represented as independent blocks in FIG. 4; however, these separately delineated steps should not be construed as necessarily order dependent in their performance. Additionally, for discussion purposes, method 400 is described with reference to elements in FIGS. 1-2. Although, at least parts of method 400 could be performed by elements other than those shown in FIGS. 1 and 2 without departing from the spirit and scope of the subject matter described herein.

In but one exemplary implementation, intelligent pico-cell 104 is remotely accessed by remote administrator 126 using, for example, a broadband connection and remote administrator module 216 (block 402). Once accessed, the information regarding the existing policy on intelligent pico-cell 104 can be gathered by remote administrator 126 through use of remote administrator module 216 (block 404) and examined to see if the policy is acceptable (block 406). If the policy is acceptable, and no changes need to be made ("yes" path from block 406) method 400 may return to block 402, or end. Alternately, however, if the existing policy is unacceptable ("no" path from block 406), then remote administrator 126 may proceed to issue a command via remote administrator module 216 to effect a suitable policy (block 408). For example, the policy may be changed to remove certain cellular carriers from a list, such that their customers may not be granted access to intelligent pico-cell 104.

Moreover, it will also be understood that certain blocks in method 400 may be skipped entirely. For example, an entity such as remote administrator 126 may access intelligent pico-cell 104 via remote administrator module 216 (block 402), then directly change the policy (block 408) without examining the existing policy (thus skipping blocks 404 and 406).

In addition, method 400 may be used by an entity to access information from intelligent pico-cell 104. In such a scenario, for example, the entity, such as remote administrator 126, could access intelligent pico-cell 104 using remote administrator module 216 (block 402) then begin gathering information about pico-cell 104, such as users, as well as information regarding the environment in which intelligent pico-cell 104 is located, including downlinked signals from other pico-cells, macro-cells, and electric devices received at intelligent pico-cell 104.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A method, comprising:
   employing a processor to execute code instructions stored in a computer-readable storage medium that, when executed by the processor, perform the following acts:
   monitoring existing radio frequency channels;
   based on the monitoring act, detecting presence of a wireless device;
   determining if the wireless device is allowed to connect to a pico-cell;
   when the determining act indicates the wireless device is allowed to connect to then pico-cell:
      issuing configuration commands for the wireless device to communicate with the pico-cell; and
      initiating a communication session if the wireless device is properly configured;
   monitoring configuration settings employed by the wireless device to communicate with the pico-cell; and
   updating the configuration commands to improve quality of communications between the wireless device and the pico-cell, wherein the updating includes issuing commands directing the wireless device to switch to at least one of a stronger radio frequency (RF) channel or a disparate power setting.

2. The method of claim 1, wherein determining if the wireless device is allowed to connect to the pico-cell includes determining if the wireless device embodies credentials necessary to access the pico-cell.

3. The method of claim 1, further comprising:
   remotely accessing the pico-cell; and
   gathering policy information guiding allowance of access to the pico-cell.

4. The method of claim 3, further comprising: if the gathered policy information is unacceptable, issuing a command to effect a suitable policy, wherein the suitable policy can exclude certain cellular-carrier customers.

5. An apparatus, comprising
   means for monitoring existing radio frequency channels;
   means for detecting presence of a wireless device based on monitored radio frequency channels;
   means for determining if the wireless device is allowed to connect to a pico-cell;
   when the means for determining indicates the wireless device is allowed to connect to the pico-cell:
      means for issuing configuration commands for the wireless device to communicate with the pico-cell; and
      means for initiating a communication session if the wireless device is Properly configured; and
   means for monitoring configuration settings employed by the wireless device to communicate with the pico-cell; and
   means for updating the configuration commands to improve quality of communications between the wireless device and the pico-cell, wherein the means for updating includes means for issuing commands directing the wireless device to switch to at least one of a stronger radio frequency (RF) channel or a disparate power setting.

6. The apparatus of claim method of claim 5, further comprising:
   means for accessing the pico-cell remotely; and
   means for gathering policy information guiding allowance of access to the pico-cell.

7. The apparatus of claim 6, further comprising: if the gathered policy information is unacceptable, means for issuing a command to effect a suitable policy, wherein the suitable policy can exclude certain cellular-carrier customers.

8. The apparatus of claim 5, further comprising means for accessing data regarding use of a pico-cell remotely.

9. A system, comprising:
   one or more processors; and
   a memory that includes code that when executed by the one or more processors implement the following components:
      an interface that monitors existing radio frequency channels and detects presence of a wireless device;
      a first module that determines if the wireless device is allowed to connect to a pico-cell;
      a selector that issues configuration commands for the wireless device to communicate with the pico-cell when the module determines the wireless device is allowed to connect to the pico-cell, and initiates a communication session if the wireless device is properly configured, the selector updates the configuration commands to improve quality of communications between the wireless device and the pico-cell, wherein to update the configuration commands to improve quality of communications between the wireless device and the pico-cell, the selector issues commands that direct the wireless device to switch to at least one of a stronger radio frequency (RF) channel or a disparate power setting; and
      a second module that monitors configuration settings employed by the wireless device to communicate with the pico-cell.

10. The system of claim 9, wherein to determine if the wireless device is allowed to connect to the pico-cell, the first module determines if the wireless device embodies credentials necessary to access the pico-cell.

11. The system of claim 9, wherein the communication session is a registration session, a normal phone conversation, or a data communication session.

12. The system of claim 9, wherein the first module receives a device identifier from the memory, the device identifier corresponds to at least one active wireless device in communication with the pico-cell.

13. The system of claim 9, wherein the first module enables pairing of the pico-cell with one or more wireless devices.

14. The system of claim 12, further comprising: a computer interface functionally coupled to the pico-cell and that allows registration of at least one wireless device allowed to connect to the pico-cell.

15. The method of claim 1, wherein the communication session is a registration session, a normal phone conversation, or a data communication session.

16. The method of claim 1, further comprising: pairing of the pico-cell with one or more wireless devices.

17. The method of claim 1, further comprising: receiving a device identifier from the computer-readable storage medium, the device identifier corresponds to at least one active wireless device in communication with the pico-cell.

* * * * *